United States Patent [19]
Jones et al.

[11] Patent Number: 5,980,084
[45] Date of Patent: Nov. 9, 1999

[54] METHOD AND APPARATUS FOR AUTOMATED ASSEMBLY

[75] Inventors: Rondall E. Jones; Randall H. Wilson; Terri L. Calton, all of Albuquerque, N.Mex.

[73] Assignee: Sandia Corporation, Albuquerque, N.Mex.

[21] Appl. No.: 08/977,269

[22] Filed: Nov. 24, 1997

[51] Int. Cl.$^6$ .............................. G06F 19/00; G06G 7/66
[52] U.S. Cl. ................. 364/468.01; 364/468.03; 364/468.09
[58] Field of Search ............ 364/468.01, 468.03, 364/468.09; 345/422, 431; 707/102, 10; 29/222, 225, 252, 402.02, 426.03, 700, 711, 724, 771, 801, 888.07

[56] References Cited

U.S. PATENT DOCUMENTS

| | | | |
|---|---|---|---|
| 5,363,475 | 11/1994 | Baker et al. | 345/422 |
| 5,717,598 | 2/1998 | Miyakawa et al. | 364/468.09 |
| 5,806,069 | 9/1998 | Wakiyama et al. | 707/102 |

*Primary Examiner*—William Grant
*Assistant Examiner*—McDieunel Marc
*Attorney, Agent, or Firm*—V. Gerald Grafe

[57] ABSTRACT

A process and apparatus generates a sequence of steps for assembly or disassembly of a mechanical system. Each step in the sequence is geometrically feasible, i.e., the part motions required are physically possible. Each step in the sequence is also constraint feasible, i.e., the step satisfies user-definable constraints. Constraints allow process and other such limitations, not usually represented in models of the completed mechanical system, to affect the sequence.

20 Claims, 10 Drawing Sheets

| Constraint | Count |
|---|---|
| REQ-SUBASSY-WHOLE | 70 |
| REQ-ORDER-LIAISON | 48 |
| REQ-CLUSTER | 11 |
| REQ-SUBASSY | 7 |
| REQ-FASTENER | 3 |
| REQ-ORDER-FIRST | 2 |
| REQ-ORDER-LAST | 2 |
| REQ-PATHS-AXIAL | 1 |

METHOD AND APPARATUS FOR AUTOMATED ASSEMBLY

This invention was made with Government support under Contract DE-AC04-94AL85000 awarded by the U.S. Department of Energy. The Government has certain rights in the invention.

BACKGROUND OF THE INVENTION

This invention relates to the field of assembly of mechanical systems, specifically automated planning of a sequence of steps for assembly or disassembly of a mechanical system comprising a plurality of parts.

Product creation has traditionally been separated into at least two stages: first a designer specifies the geometry and physical qualities of the finished product to perform the function needed, then a manufacturing engineer takes over and tries to find a way to manufacture the product. If it is too difficult to manufacture, the product is sent back for redesign, and the cycle repeats. Because the design of the product and the design of the manufacturing process are only loosely coupled, many cycles may be required to find a satisfactory design, while the final artifact usually remains more expensive to build than necessary.

Concurrent design of a product and the process to make it is one way to address this problem. In concurrent design, the manufacturing process is created simultaneously with the product plans, so that constraints arising from manufacturing can be directly incorporated into the product design, thereby reducing global iteration. In addition, automated tools support this process at a high level. Human engineers use computer workstations to build a shared product model, which is continually updated and critiqued to give the designers manufacturing and servicing feedback about the design. Some of the tools affecting the developing product model are computer programs, which do process planning, check for consistency, and perform other tasks previously left to human engineers.

A proficient assembly planner is an integral part of a concurrent design system. A good assembly process can reduce assembly time, raise quality and reliability, allow greater flexibility in responding to equipment failures, and reduce capital costs for robots and fixtures. Furthermore, many of the manufacturing constraints that influence a product design come from the need to assemble constituent parts of the product. For example, the assembly scheme of a product influences the tolerances imposed on individual parts, the shape of mating surfaces, and the design of fasteners.

Assembly planning for production is typically performed by an industrial engineer. Service and repair technicians devise reasonably efficient and error-free disassembly and reassembly plans on the fly. However, assembly planning is complicated and time-consuming for a human. Besides avoiding the high cost of an engineer's time, an automated assembly planner can accelerate the generation of an assembly plan. With higher planning speed comes faster introduction of manufacturing constraints into the design process, as well as shorter time-to-market.

Intuition, rules of thumb, and approximate reasoning help human engineers to quickly find good assembly plans, but they also may lead them to overlook the best assembly plan. An automated assembly planner can evaluate many feasible assembly plans to ensure that no better procedure exists. Furthermore, by exploring the set of alternative plans generated by the planner, or "plan space," a designer can come to a better understanding of the manufacturing aspects of the design.

Current automated assembly planners rely on a broad array of techniques, each addressing certain aspects of the problem. These techniques can be roughly divided into Artificial Intelligence approaches to planning, planners specifically designed for assembly sequencing, physical reasoning to validate single assembly operations, and computational geometry approaches.

ARTIFICIAL INTELLIGENCE PLANNING

STRIPS, NOAH, and SIPE are examples of traditional AI (artificial intelligence) planning systems. See, e.g., Fikes et al., "Strips: A new approach to the application of theorem proving to problem solving," *Artificial Intelligence*, 2:189–208, 1971; Wilkins, "Domain-independent planning: Representation and plan generation," *Artificial Intelligence*, 22(3):269–301, 1984. The blocks world was an early Artificial Intelligence ("AI") planning system consisting of blocks that could be stacked and unstacked. NOAH was originally aimed at supplying instructions to a human to repair an air compressor, including disassembly and assembly plans. In typical domains for these planners, actions are quite varied (for instance moving between rooms, grasping objects, recharging batteries), while geometric constraints are expressed in a few simple logical predicates, such as ON(A, B) or IN(pen, Rooml). In contrast, an automated assembly planner need only consider a few types of operations joining two subassemblies, certain fixturing operations), while the constraints arising from geometric models are so complicated that expressing them in a logical notation would be exhausting and inefficient. Hence AI planning techniques can be ill-suited to the geometric reasoning required for automated assembly planning.

ASSEMBLY SEQUENCING

A number of planning systems have been targeted specifically at assembly sequencing. An early planning system started with a liaison graph of the assembly, which is a graph of connections between the parts. Liaisons usually, but not always, involve contact between the two parts. An assembly sequence corresponds to a particular order in which the liaisons can be established. Geometric reasoning was supplied by a human, who answered carefully constructed, yes-no questions about whether certain liaisons can be established before or after others. From the answers to these questions, the assembly sequences for the product were inferred.

A later planning system reduced the number of questions and answers required to represent the physical knowledge. DeFazio et al., "Simplified generation of all mechanical assembly sequences," *IEEE Journal of Robotics and Automation*, RA-3(6):640–658, 1987. The user answered each question with a logical formula characterizing the situations in which a liaison can be established. Unfortunately, these formulas became complicated and difficult to create accurately for realistically large assemblies.

A planning system at Carnegie-Mellon University used disassembly planning to automatically generate assembly sequences. Disassembly planning computes a way to disassemble the product, then reverses the sequence to produce an assembly sequence. To identify a single feasible operation, the method generates all possible subassemblies and tests the operation removing each subassembly from the rest of the assembly. An operation is tested by a predicate that includes geometric, mechanical, and stability checks. Local freedom was the main geometric test computed in the Carnegie-Mellon system; a subassembly is locally free when it can move a small distance relative to the rest of the assembly considered as a solid. In this generate-and-test approach, a number of candidate operations exponential in the number of parts can be generated before a feasible operation is found, rendering the approach impractical for large assemblies.

Wolter computed linear assembly sequences for a product, in which each operation joins a single part to a subassembly. Wolter, "On the automatic generation of assembly plans," in *Computer-Aided Mechanical Assembly Planning*, de Mello and Lee, editors, pages 263–288, Kluwer, 1991. The sequences were optimized according to certain criteria. However, the input to the method included possible motions for each part, and sets of other parts that interfere with each motion. No systematic way of generating the possible part motions was given, and the sequencer did no geometric computation.

A number of other approaches to automatic assembly sequencing have been proposed. One involved a number of heuristics to group parts of an assembly into subassemblies, but parts could only move along the major axes, and some operations may not be found. Another generated disassembly sequences involving complicated motions. However, some assembly sequences can be missed, and the directions of motion were required as input.

MOTION PLANNING

An assembly sequencing problem can be seen as a motion planning problem with multiple moving objects. Each part can be viewed as an independent robot, and a collision-free path must be found for the individual parts to move from an unassembled state to the assembled state. However, the general motion planning problem is known to take time exponential in the number of degrees of freedom; for an assembly of n rigid parts this formulation yields 6n degrees of freedom, so using a general path planning system in this naive way is impractical.

Motion planning plays a more limited role in determining feasible insertion trajectories for single assembly operations. Many general methods make assumptions that are not compatible with assembly planning, while answering more complex questions than are needed. For instance, some motion planning systems approximate the shapes of objects or assume the objects do not come in contact, both drawbacks for assembly planning.

Some motion planning methods have been developed specifically to suit the requirements of assembly planning. Valade found disassembly trajectories by calculating the interactions between concavities and objects and trying to reduce those interactions, until the parts were separated. Valade, "Geometric reasoning and automatic synthesis of assembly trajectory," *Proc. Intl. Conf. On Advanced Robotics*, pp. 43–50, 1985. In the preimage backchaining approach to fine-motion planning, the uncertainty of both sensing and control are modeled explicitly to find guaranteed plans to achieve a goal despite the high relative uncertainties present in assembly operations. Another method for analyzing insertion of flexible parts modeled them as compliant connections between rigid bodies.

The above methods are useful to verify the feasibility of individual assembly operations. Unfortunately, they all require that a large number of assembly operations be generated and then tested; none supply a way to generate only those operations that satisfy the constraints.

COMPUTATIONAL GEOMETRY

Research in computational geometry addresses limited cases of geometric assembly sequencing. Arkin et al. used the concept of a monotone path between obstacles to deduce a removable subassembly and a single extended translation to remove it. Arkin et al., "On monotone paths among obstacles, with applications to planning assemblies," *Proc. 5th ACM Symp. on Computational Geometry*, pp. 334–343, 1989. However, the parts were limited to polygons in the plane, and the extension to three dimensions is not obvious. Pollack et al. considered sequences of translations to separate polygons. Pollack et al., "Separating two simple polygons by a sequence of translations," *Discrete and Computational Geometry*, 3:123–136, 1988. The algorithm is limited to planar assemblies of two parts, but is able to find separating motions consisting of several distinct translations. Most of these methods are limited to two dimensions or allow only polyhedral parts; in addition, it is unclear how additional constraints, for instance arising from clamping forces or stability, can be included.

SUMMARY

Current methods for evaluating the manufacturing aspects of a product design can require extensive human judgment, and designers complain that they are tedious to use. One current planning system requires computationally expensive determinations of mating paths for each trial assembly. Lee, U.S. Pat. No. 5,442,563. Another uses an AND/OR graph to unfold all the assembly/disassembly steps that might be followed. Jeong, U.S. Pat. No. 5,523,960. The AND/OR graphs of realistic assemblies are generally far too complicated for timely planning. A fast, automatic assembly planning system would allow a designer to ask "what if" questions, quickly find the consequences of design decisions, and more easily evaluate the manufacturing impact of alternative designs.

Small batch manufacturing requires that assembly machines, people, and processes switch from one product to another quickly and often. An automated assembly planning system can help to merge the assembly schemes for several products and allow faster changeover. In addition, small batch size only amplifies the importance of low capital costs and fast creation of a manufacturing process.

A hybrid system, allowing a human to work in tandem with an automated assembly planner, could relieve the engineer from much of the repetitive and tedious work of devising an assembly plan. Meanwhile, the computer would check the human reasoning for consistency. A more competent, efficient, and accurate assembly planning system would result.

An automated assembly planning system can have great utility in both concurrent engineering and more mainstream manufacturing planning. There is a need for an automated assembly planning system that has the following characteristics:

Autonomy. Using the assembly planning system must require minimal effort from the designer. A human will quickly tire of doing detailed geometric reasoning, or even supplementing the assembly model to help the assembly planning system. As a result, the assembly planning system should build its model of the target assembly from readily available data, such as a CAD model of the product. Furthermore, the assembly planning system must include automated geometric and physical reasoning capabilities to allow it to generate assembly plans from just the assembly model given by a designer. Any required human input should be sparse, be useful to the designer, and lack tedium.

Accuracy. If an assembly planning system returns bad assembly plans or fails to find plans when they exist, it will quickly lose what little trust the human will place in the computer. Thus the employed geometric reasoning methods cannot ignore important details, the search algorithms must be correct and complete, and approximations must be relevant to the assembly planning domain.

Speed. If the engineer has to wait a long time to get assembly feedback from the system, it will be used infrequently, and the advantages of concurrent design will be lost.

SUMMARY OF THE INVENTION

The present invention provides an autonomous, accurate, and fast method and apparatus for generating sequences of steps for assembly or disassembly of a mechanical system. An apparatus according to the present invention comprises a processing unit with attached storage system, input device, and output device. The apparatus additionally comprises hardware, software, or combinations thereof for using the input device to load a model of a mechanical system into the storage system, using the input device to load constraints into the storage system, and using the output device to communicate disassembly sequences. The apparatus additionally comprises software to generate a candidate disassembly sequence, where a candidate disassembly sequence comprises a sequence of disassembly steps, each disassembly step being both constraint feasible and geometrically feasible. The apparatus additionally comprises software to perform the steps of generating a candidate disassembly sequence, communicating the candidate disassembly sequence, accepting new definitions of constraints, then restarting with a new candidate disassembly sequence.

The present invention also provides a process for using a computer to generate a disassembly sequence for a mechanical system. The process comprises the steps of loading a model of a mechanical system into the computer, generating a candidate disassembly sequence that is both geometrically feasible and constraint feasible, communicating the candidate disassembly sequence, accepting new constraint definitions, and restarting with a new candidate disassembly sequence.

The method and apparatus of the present invention can be used, for example, in interactive design and assembly planning systems. Candidate disassembly sequences can be communicated by displaying to a user. The user can then edit constraints, for example by adding constraints driven by assembly process restrictions. The user can also edit the design, for example by relocating or reshaping parts to ease assembly. The new constraints or new mechanical system design can the be used with the process or apparatus of the present invention to generate new disassembly sequences, automating one tedious step of a conventional design process and allowing the user to focus attention on capture of the mechanical system functionality in the design and process restrictions in the constraints.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides an autonomous, accurate, and fast method and apparatus for generating sequences of steps for assembly or disassembly of a mechanical system. A sequence of steps for disassembly of a mechanical system, followed in reverse order, can result in a sequence of steps for assembly of the mechanical system. As used herein, "disassembly sequence" refers to a sequence of steps that can accomplish disassembly of the mechanical system when followed in one order or a sequence of steps that can accomplish assembly of the mechanical system when followed in reverse order (note that certain irreversible steps such as welding can lead to sequences that accomplish assembly or disassembly but not both).

Figures 1, 11:
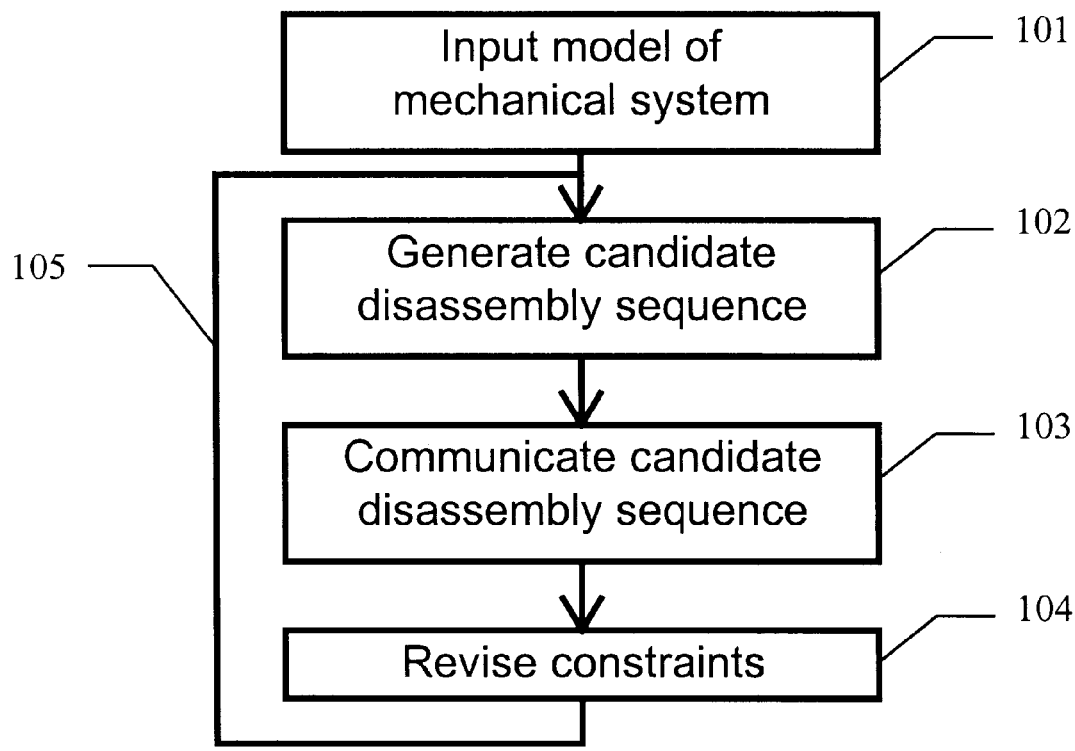
FIG. 1 is a flow diagram of a process according to the present invention.
FIG. 11 is a breakdown of the constraints used to produce a useful assembly plan for the initial design of the guidance section of a Hughes Aircraft AIM-9x air-to-air missile.

FIG. 1 shows a flow diagram of a process according to the present invention. The process begins by inputting a model of the mechanical system 101. The model can contain definitions of the parts of the mechanical system and definitions of the relationship between parts in the assembled mechanical system. The model can also contain additional information pertinent to assembly, such as process constraints or material properties.

Next, a candidate disassembly sequence is generated 102. The candidate disassembly sequence must be constraint feasible and geometrically feasible. Geometric feasibility means that the steps in the disassembly sequence do not require parts to move in geometrically impossible ways (such as through other solid parts). Constraint feasibility means that the steps in the disassembly sequence do not violate constraints (such as by violating process constraints input from the user).

The candidate disassembly sequence is then communicated 103, for example by displaying on a display device. The sequence can be communicated to a user, or to an additional automated tool. A user can assess the sequence and, if desired, change constraints 104 that affect the generation of the candidate disassembly sequence. The external automated tool can assess the candidate disassembly sequence for compliance with additional requirements, such as cost or time, and change the constraints 104 accordingly. The process can then repeat 105, generating a new candidate disassembly sequence that is constraint feasible with the revised constraints 102.

Figure 2:
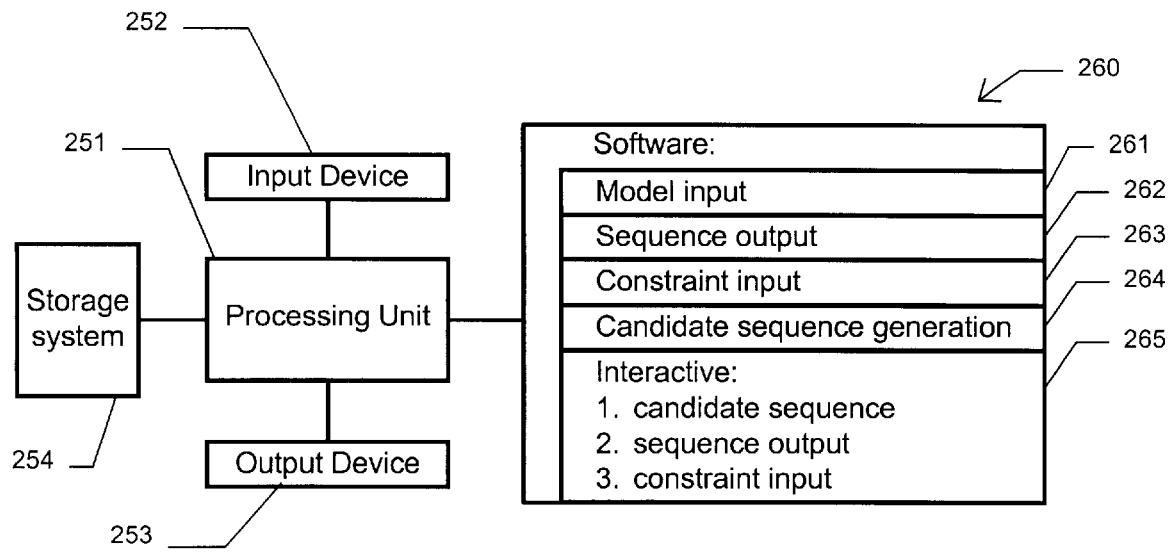
FIG. 2 is an illustration of an apparatus according to the present invention.

FIG. 2 illustrates an apparatus according to the present invention. Processing unit 251 connects with input device 252, output device 253, storage system 254, and software 260. Software 260 comprises model input software 261, sequence output software 262, constraint input software 263, candidate sequence generation software 264, and iterative software 265.

Processing unit 251 can comprise, for example, a microprocessor, a multiprocessor, or a workstation. Those skilled in the art will appreciate other suitable processing apparatus. Input device 252 can comprise, for example, a keyboard, a pointing device such as a mouse or digitizer, a voice input system, a tape or disk reader, a computer network interface, a scanner, or combinations thereof. Those skilled in the art will appreciate other suitable input devices. Output device 253 can comprise, for example, a display screen, a multidimensional display system, a printer, an audio output system, a computer network interface, a disk or tape writer, or combinations thereof. Those skilled in the art will appreciate other suitable output devices. Storage system 254 can comprise semiconductor memory, disk storage, tape storage, a computer network connection to other storage resources, optical storage, or combinations thereof. Those skilled in the art will appreciate other suitable storage systems.

Software 260 can be stored in storage system 254, in separate storage (not shown), accessed from a computer network interface (not shown), directly implemented in hardware (not shown), or stored and accessed in other manners known to those skilled in the art. Model input software 261 comprises software that uses input device 252 to read a model of a mechanical system and store it in storage system 254. Model input software 261 can be software executed by processing unit 251, or can be a separate subsystem operating in coordination with processing unit 251. Constraint input software 263 comprises software that causes input device 252 to read constraint definitions and store them in storage system 254. Constraint input software 261 can be software executed by processing unit 251 or can be a separate subsystem operating in coordination with processing unit 251. Sequence output software 262 comprises software that communicates a disassembly sequence using output device 253. Sequence output software 261 can be software executed by processing unit 251 or can be a separate subsystem operating in coordination with processing unit 251. For example, sequence output software 261 can be software that drives a display screen output device 253 to present an animation of a disassembly sequence.

Candidate sequence generation software 264 operates using the model of the mechanical system to generate a candidate disassembly sequence. A detailed example of suitable candidate generation software is given below. The candidate disassembly sequence is geometrically feasible and constraint feasible, and can be a complete disassembly sequence or a partial disassembly sequence. A partial disassembly sequence can result when, for example, geometric and constraint feasibility preclude the generation of a complete disassembly sequence.

Iterative software 265 causes candidate sequence generation software 264 to generate a candidate disassembly sequence. It then causes sequence output software 262 to communicate the candidate disassembly sequence, for example by displaying on a screen. It then causes constraint input software 263 to accept additional or modified constraints, for example by accepting keyboard input from a user. It then restarts with candidate sequence generation software 264, generating and communicating a new candidate sequence satisfying the new or modified constraints. Iterative software 265 can continue until a desired terminal condition is reached, for example by the user signifying acceptance of a disassembly sequence, by exhaustion of all possible disassembly sequences, by failure to find a candidate disassembly sequence, or sufficient elapsed time.

FIGS. 3(a–j) illustrates a disassembly sequence generated according to the present invention. For ease of understanding, the disassembly sequence is presented in reverse order as an assembly sequence. The parts to be assembled comprise a gear 301, three posts 302, 303, 304, and two washers 305, 306. Posts 302, 303, 304 insert into gear 301. Washers 305, 306 rest against gear 301 around posts 302, 303. FIG. 3a shows a first step in an assembly sequence, comprising a single part, the gear 301. FIG. 3b shows a second step in an assembly sequence, comprising washer 305 placed on gear 301 in the appropriate position. FIG. 3c shows a third step in an assembly sequence, comprising washer 306 placed on gear 301 in the appropriate position. FIG. 3d shows a fourth step in an assembly sequence, comprising post 301 inserted into the appropriate position in gear 301. Note that the assembly sequence presented in FIGS. 3(a–d) is geometrically valid: no physically impossible part movements are required. It might pose difficulties in a production application, however, since washers 305, 306 are placed on gear 301 without anything to hold them in place until the corresponding posts are later inserted.

A constraint can be added to correct this weakness in the plan. Specifically, a constraint can be added specifying that posts 302, 303, 304 must be inserted before any of washers 305, 306 can be placed. FIGS. 3(e–j) show the steps in an assembly sequence generated according to the present invention with this constraint added. All three posts 302, 303, 304 have been inserted by FIG. 3h. Washers 305, 306 are added in FIGS. 3(i,j), after posts 302, 303, 304 are present to hold them in place. The early placement of washers 305, 306 shown in FIGS. 3(b,c) would violate the added constraint, and so the method of the present invention would not accept that order of assembly.

EXAMPLE IMPLEMENTATION

The present invention was implemented and tested as described below. Part of the example implementation was based on the automated assembly planner described by Kaufman et al. in "The Archimedes 2 Mechanical Assembly Planning System," *Proc. IEEE Intl. Conf. On Robotics and Automation*, 1996, incorporated herein by reference. Many characteristics of the implementation depend on the product to be assembled, the assembly facility, the assembly volume, and other factors. A description of the design choices made for the example implementation is presented below.

Figure 4:
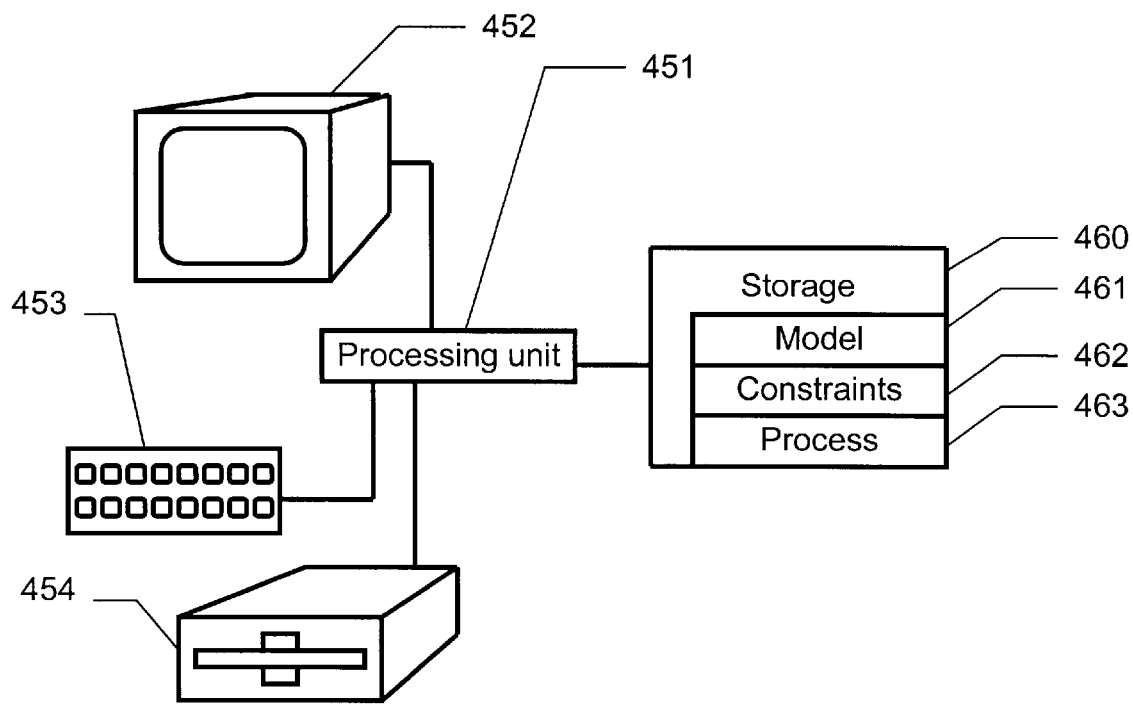
FIG. 4 is an illustration of an apparatus used in an example implementation of the present invention.
Figure 3A:
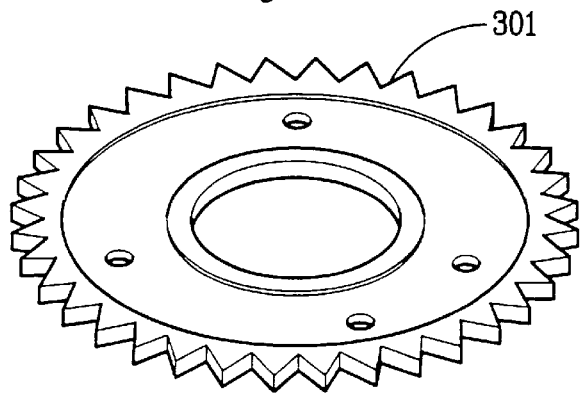
FIG. 3(a–j) is an illustration of disassembly sequences generated according to the present invention.
Figure 3B:
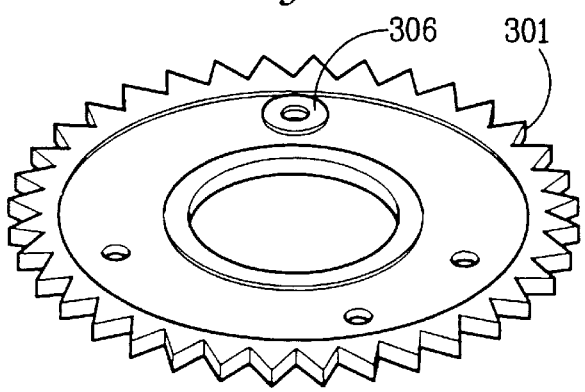
Figure 3C:
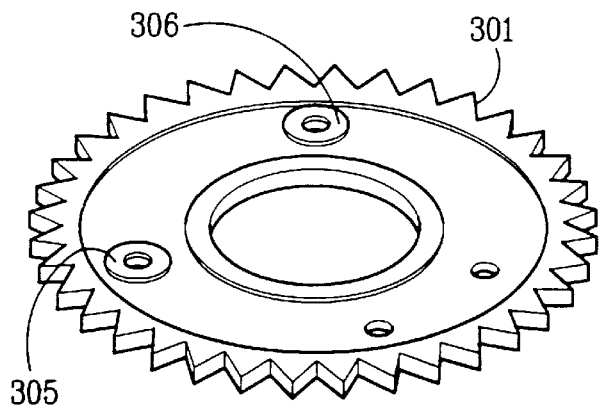
Figure 3D:
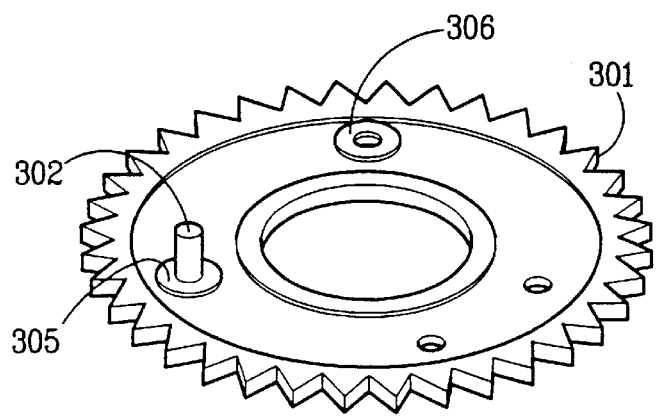
Figure 3E:
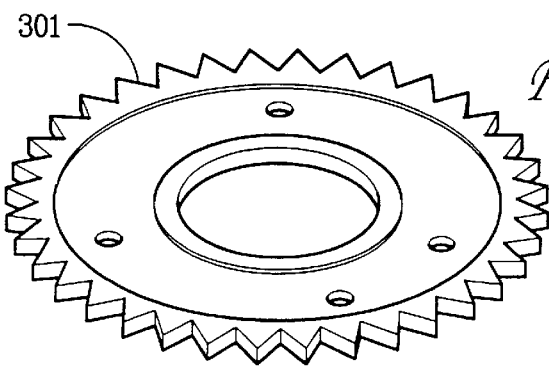
Figure 3F:
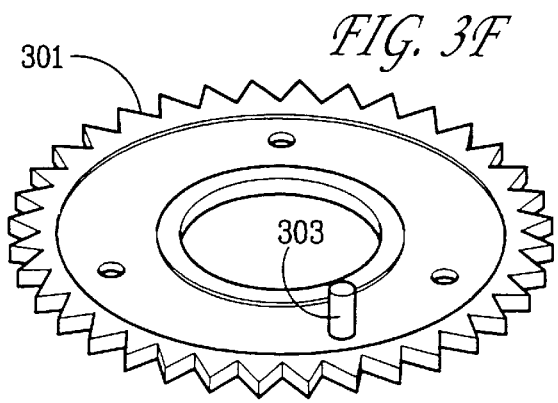
Figure 3G:
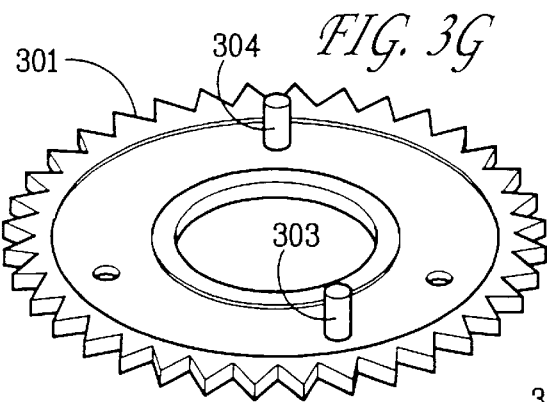
Figure 3H:
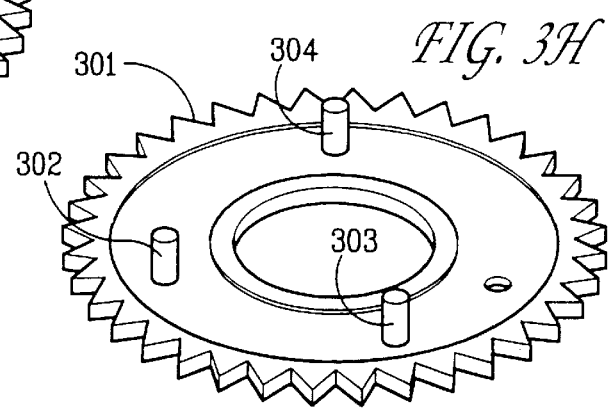
Figure 3I:
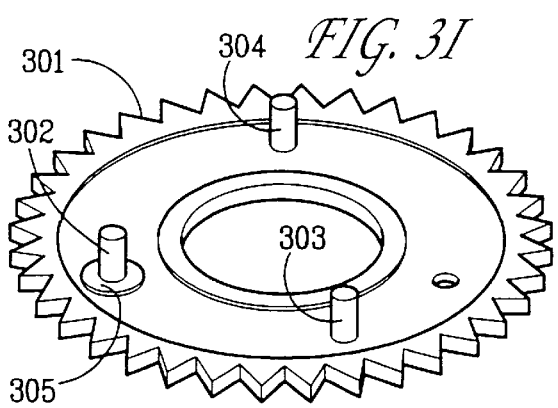
Figure 3J:
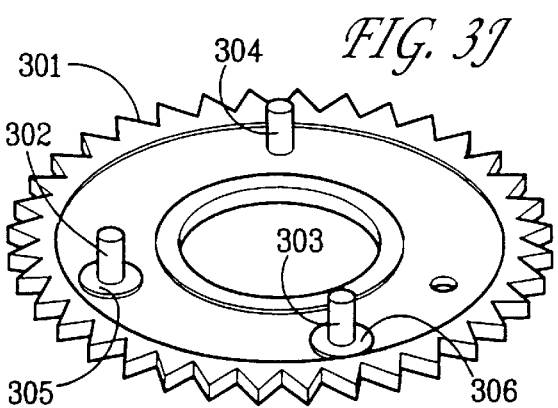

FIG. 4 shows the apparatus used. Processing unit 451 connects with input devices keyboard 453 and disk drive 454, and with output device display 452, and with storage system 460. Storage system 460 comprises semiconductor memory (not shown) and disk storage (not shown). Storage system 460 stores a model 461 of the mechanical system, a set of constraints 462, and process software 463 (described in detail below). A Silicon Graphics Indigo-2 workstation, with High Impact graphics, a R10000 processor, 128 Mbytes memory, and 4 Gbytes disk storage is an example of a commercially available system suitable for use with the present invention. Those skilled in the art will appreciate other widely available systems suitable for use with the present invention.

Figure 5:
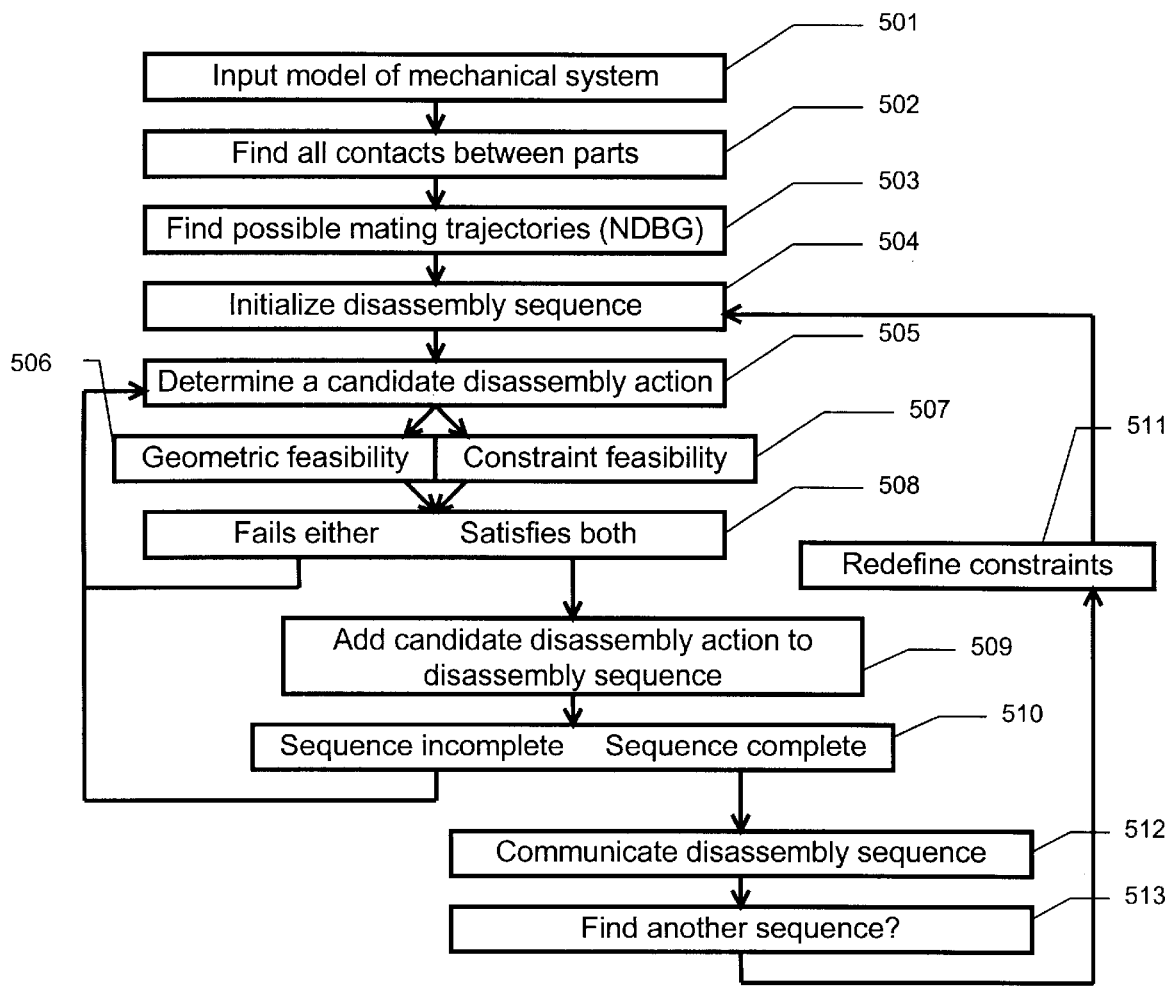
FIG. 5 is a detailed flow diagram of process software pictured in FIG. 4.

FIG. 5 shows a detailed flow diagram of the process software pictured in FIG. 4. The process begins by loading a model of a mechanical system 501. All contacts between parts are then found 502. Possible part mating trajectories are then selected and stored in a non-directional blocking graph (hereinafter "NDBG"). NDBG graphs are explained by Wilson et al., in "Geometric Reasoning About Mechanical Assembly," *Artificial Intelligence*, 71 (2):371–396, 1994, incorporated herein by reference, and by Wilson in "On Geometric Assembly Planning," PhD thesis, Stanford University, March 1992, Stanford Technical Report STAN- CS-92-1416, incorporated herein by reference. The disassembly sequence is then initialized 504, typically to empty.

A candidate disassembly action is chosen using the NDBG 505. Note that a candidate disassembly action can be an action that is a step in disassembling the mechanical system, or can be an action that, when viewed in reverse, is a step in assembling the mechanical system. The candidate disassembly action is checked for geometric feasibility 506 and for constraint feasibility 507. If the candidate disassembly action does not satisfy both 508, then the process restarts beginning with a new candidate disassembly action 505. If there are no more possible candidate disassembly actions and a desired terminal condition has not yet been reached, then the planner fails (not shown). If, however, the candidate disassembly action is both geometrically feasible and constraint feasible, then it is added to the disassembly sequence 509.

If the disassembly sequence has not reached a desired terminal condition 510, such as complete disassembly, then the process repeats beginning with a new candidate disassembly action 505. If it has reach a desired terminal condition 510, then the sequence is communicated 512, such as by displaying to a user. If the user desires a new disassembly sequence 513, then redefinition of the constraints is allowed 511, such as by adding new constraints or editing, deleting, or suspending existing constraints.

GEOMETRIC FEASIBILITY

The example implementation checked geometric feasibility by checking part removal trajectories. If a part can move at all, the distance it can move before colliding with any other part must be sufficient to remove it completely from the rest of the assembly. One way to do this is with volume sweeping computations, such as those provided by commercially available solid modeling software. When parts have complex geometries, however, such methods can be prohibitively slow. The example implementation used a method of collision detection which exploits the hardware capabilities of a graphics workstation. The method is raster-based, discretizing the silhouettes of the facetted representation of parts in a plane perpendicular to the direction of motion, but otherwise making no simplifying assumptions or approximations.

A brief summary of the available graphics hardware helps to explain how the method works. The displayed image has color intensity values stored in a hardware buffer, called the image buffer, for each pixel. Another hardware buffer, called the z-buffer, stores the distance of each pixel from the viewpoint. This buffer is typically used in rendering 3D scenes in which occluded objects should not be displayed; it works as follows. Each pixel of the z-buffer is initialized to the maximum distance. For each object displayed, each pixel that will be in its displayed image is checked for its distance to the viewpoint. If it is less than the current distance stored in the z-buffer, the image buffer is updated with the intensity value of the pixel and the z-buffer is updated. If it is greater than the current distance, the object is occluded, and so the image buffer is not updated.

The graphics hardware allows the distance comparison to be a greater-than test instead of less-than. This setting can be modified from the program; it is the key to the fast checking. To test if part A will collide with part B when A is translated to infinity, the z-buffer is first cleared. The viewpoint is set to be the opposite of the sweep direction, so the sweep is effectively away from the viewpoint. Part A is drawn in black, then part B is drawn in white, with the greater-than distance comparison. Any pixels of part B that are outside the boundary of part A will not be drawn, since they are not further than the maximum distance to which the z-buffer has been initialized. If any pixels of part B are drawn, it is because they are further than the pixels of part A; since we are viewing along the sweep direction, this means that part A will collide with part B at some point along an infinite translation. Therefore, we need only check for a certain minimum pattern of white pixels in the image buffer (scattered white pixels can arise from facetting imprecision and do not necessarily indicate part collisions). For example, a cruciform pattern of white pixels can indicate that a collision is extensive enough to be treated as a part collision. This is easily done using the programming interface to the graphics system.

These operations are all performed in hardware. Translations of any 3D direction, and 3D parts of any shape can be tested, since the graphics hardware applies the proper transformations during rendering.

CONSTRAINTS

A large number of constraints have been proposed for automated assembly planning. See, e.g., Jones et al., "A Survey of Constraints in Automated Assembly Planning," *Proc. IEEE Intl. Conf. On Robotics and Automation*, 1996, incorporated herein by reference. The example implementation provided a library of constraint types, described in detail below, from which the user can instantiate constraints on the assembly plan. For instance, one type of constraint is called REQ-SUBASSY; it requires that a particular set of parts appear as a subassembly (with no other parts present) at some point in the plan. To instantiate a REQ-SUBASSY constraint, the user selects the parts that must belong to the subassembly. Multiple REQ-SUBASSY constraints can be instantiated, each with a different, non-conflicting, set of parts.

Constraints were implemented as filters. During planning, each proposed assembly operation was passed to each constraint's filter function, which returned true or false depending on whether or not the operation satisfied the constraint. Only an operation that satisfied all current constraints was feasible. For instance, consider an operation mating subassembly S1 to subassembly S2. The filter function of a REQ-SUBASSY constraint with part set P returned true if and only if $$P \subseteq S_1 \vee P \subseteq S_2 \vee (S_1 \cup S_2) \subseteq P \vee [(S_1 \cup S_2) \cap P] = 0 \quad \text{(equation 1)}$$

In other words, the operation satisfied the constraint if it kept the parts in P together, if only parts in P were involved, or if no parts in P were involved.

As a standard interface to all constraints, the filter function provided a number of benefits. First and foremost, it made the implementation of each constraint type independent. Interactions between constraints need not be considered, and each constraint was implemented in its most straightforward and efficient way. This becomes important as the number of constraint types grows. In addition, constraints can vary in the data associated with them, their instantiation routines, various debugging outputs, and so on.

Filter functions are flexible enough to implement a large number of constraints. The flexibility is further demonstrated by the REQ-TOOL constraint, which encoded tool accessibility constraints for various hand and robotic tools within the framework.

While filter functions themselves are usually quite fast, the generate-and-test abstraction built into the example implementation can sometimes lead to an inefficient planning process. This is particularly true when many dead-ends appear in the search space, or when a large number of assembly operations are generated but few satisfy the constraints. In many cases, special purpose routines can increase efficiency.

The constraints in the example implementation are described below. In the following description, a set of parts, sometimes called "sub", is being proposed for disassembly into two component sets called "move" and "staty". The stat set represent the main portion of the assembly, when that concept is relevant. In such cases, the move set represents the parts which are being added to the main portion. The move set is considered to be moving along a specified "trajectory". Often the move set will be a single part. Where relevant, the details of the actions, such as the trajectory of a part removal, are assumed to be available.

Each instantiation of a constraint has an associated set of "controlled parts". This set of controlled parts is usually referred to by the name "group". For example, if three particular parts are to be assembled as a cluster, without interruption, then a REQ-CLUSTER constraint can be declared with these three parts making up the "group". The following presents how the example implementation implemented the validity checking function for each constraint (given its defining set of controlled parts, called group, and any other data specific to that constraint), for a proposed action consisting of a particular pair of stat and move sets, and any required related information. The example implementation submitted each proposed action to the valid( )function for every constraint before accepting the candidate disassembly action as feasible. If any one of the valid() functions returned FALSE, the candidate disassembly action was rejected.

PRH-STATE (prohibit state). This constraint prohibits any disassembly action which would create a child state (i.e., either a removed subassembly, move, or the remaining partial assembly, stat) which consists precisely of a particular set of parts. That is, the operation is invalid if (move =group) or (stat =group). One purpose of this constraint can be to avoid use of a difficult to handle arrangement of parts.

PRH-SUBASSY (prohibit subassembly). This constraint prohibits any removed subassembly (i.e., "move", as opposed to the stationary main assembly, "stat") from containing a specified set of parts. That is, the action is invalid if (group 532 move).

REQ-CLUSTER (require a cluster). This constraint requires that the specified group of parts be completed once it is started, without interruption by parts not in the cluster. This is implemented as follows:

1. If the union of stat and move contain no controlled parts (i.e., parts in group) then the controlled group of parts is not involved with this action, so the action is considered valid.
2. Otherwise, (if there is some involvement of parts in group) then we check to see if move consists only of parts that are in group. If so then the cluster is in the process of formation, and the action is valid.
3. If neither of the above tests pasts, then we check to see if the entire cluster is contained within move or within stat. If so, then the cluster has not yet started being disassembled. Alternatively, viewed as an assembly task, the cluster is already assembled. In this event, the action is valid.
4. If none of the above tests shows the action to be valid, then it is an invalid action.

REQ-FASTENER (require fastener). This constraint declares that one or more parts are to be treated as fasteners for a set of two or more other parts. This means that as soon as the fastened parts are placed into the assembly, we must be able to immediately place all the given fasteners into the assembly, or the action is not valid. Viewed as a disassembly process, this means that if we are to remove any one or more of the fastened parts from the assembly, then we must be able to remove all the fasteners just before that part(s) is removed.

The logic to determine if an action is valid for this constraint is, if the fastened parts are all contained in stat, then:

1. if all the fasteners are also contained in stat, then the constraint is already satisfied, so the operation is valid.
2. if not all the fasteners are contained in stat, then the operation is valid if and only if move contains only fasteners.

If the fasteners are all contained in move, the logic is exactly as for the above case, with the roles of move and stat interchanged.

Otherwise, (that is, if the fastened parts are not fully contained in either stat or move) the operation is valid unless one or more fasteners is present in the candidate action, in which case it is invalid. (because fasteners are not allowed to be present before the set of fastened parts is complete.)

REQ-LINEAR-CLUSTER. This constraint requires that a defined set of parts be assembled as a cluster, and in linear fashion (i.e., with exactly one part added at a time.). This constraint is implemented just like REQ-CLUSTER, except for the additional check to see if the number of parts in move is exactly 1.

REQ-LINEAR-PARTS. This constraint requires that a controlled set of parts ("group") be assembled linearly (i.e., one at a time) anytime they are forming a liaison with members of a second defined set of parts ("second"). The parts are not required to be assembled sequentially. This definition is more complex than may seem necessary on first thought. However, note that all parts are always assembled linearly when they are first placed into the assembly, such as in a small subassembly. Thus, a more careful definition can allow the user to specify a particular situation in which the part must be placed individually, rather than within a subassembly.

The logic for this constraint is:

1. If move intersects group and stat intersects second, then move must contain exactly one part, or the action is invalid.
2. If stat intersects group and move intersects second, then stat must contain exactly one part, or the action is invalid.
3. If neither case 1 or 2 holds, then the action is considered to be valid (and irrelevant). REQ-ORDER-FIRST. This constraint requires that a part (or cluster of parts) be first in the assembly process. Note that this constraint may not work in the manner a naive user might expect if the plan is non-linear, since there is no implied time ordering between actions that occur in separate subassemblies. In non-linear plans all this constraint can do is assure that the controlled parts are in the stationary part of the assembly when other parts are added to them. In practice, one may need to combine this constraint with a constraint such as REQ-LINEAR-PARTS that controls use of subassemblies.

The implementation logic is:

1. If all parts (i.e., move/stat) involved in the action are contained within group, then the operation is valid (i.e., it is an action within the set of "first" parts).
2. Otherwise, (i.e., if parts not in the controlled group are involved), if move contains any parts in the "first" set, then the operation is invalid.

3. Otherwise, the action is valid.

The second step above is more easily understood if one remembers that the process considers each action to be a stage in the disassembly of the device. Thus, parts to be "assembled first" must be "disassembled last". So, in step two we are requiring that no "first" parts be removed if there are other parts available to remove.

REQ-ORDER-LAST. This constraint requires that a part (or cluster of parts) be last in the assembly process. See REQ-ORDER-FIRST for discussion of the meaning of "order" in non-linear plans. Note that parts to be "assembled last" must be "disassembled first", and this is how the constraint is implemented:

1. If the action involves no controlled parts, then it is valid (i.e., the parts to be disassembled first are already gone, or being handled in a separate subassembly.)
2. Otherwise (i.e., if one or more controlled parts is present in move or stat), then move must contain only parts of group (i.e., move must consist of parts to be disassembled first.)

REQ-ORDER-LIAISON. This constraint requires that all liaisons among a given set of parts be established before any liaisons in a given second set of parts are established. No requirement is imposed on the order of liaison establishment within either set. It is possible, for example, use a REQ-CLUSTER constraint in addition to this constraint to require one of the sets to be assembled as a cluster. Also, the second set of liaisons is not required to be established immediately after the first set. In the case of non-linear plans, the meaning of this constraint is that the first group of liaisons must be established before the involved parts are joined to any parts which constitute a liaison in the second set.

The logic which implements this constraint is as follows, where the second set of parts is called "second":

1. If there are no parts of group involved (in move/stat), then the action is considered valid by default.
2. If fewer than two parts of second are contained in the action, then the action is considered valid by default, since there are no liaisons present involving second.
3. Otherwise (that is, if at least one part of group and two parts of second are involved), the action is valid if and only if all of group is contained within move, or is contained within stat.

REQ-ORDER-PART. This constraint requires that all parts in a given first set of parts be placed into the assembly before any of the parts in a given second set. No requirement is imposed on the order of assembly within either set, though one may, for example, use a REQ-CLUSTER in addition to this constraint to require one of the sets to be assembled as a cluster. The second set of parts is not required to immediately follow the first set. In other words, this constraint simply imposes an assembly order precedence between two set of parts. In the case of non-linear plans, the meaning is that the first set must be complete before it is joined to any parts of the second set, but the second set may have been "previously" assembled—as a separate subassembly, for example. In the case of non-linear plans, REQ-ORDER-PART constraints with just one part in the first set have no effect.

The logic for this constraint is straightforward. Calling the second set of controlled parts "second":

1. If there are no parts of second present in move/stat, then the action is valid by default.
2. If there are parts of second present, then all members of group which are present in the action must be in move, or all must be in stat, or the action is invalid.

Note that the above description may seem incomplete. Shouldn't we insist that all members of group be in move, or be in stat, rather than just all present members of group? But remember that the validity check is always done for every action in the entire disassembly plan. The present definition may not catch every invalid disassembly plan at the earliest possible point, but it will veto a bad disassembly plan at some point, and it has the benefit of simplicity.

REQ-PART-SPECIAL. This constraint allows the user to determine interactively whether each proposed action with a part (or any of a set of parts) is acceptable. This constraint is implemented by simply checking to see if either move or stat in the proposed action consists strictly of controlled parts (the user is presumably interested in the parts as they are being added to the assembly, not just anytime they are present in a later action). If so, the proposed action is presented to the user via the output device, and the user is requested to answer whether the action is valid or not. For example, this would be one way for a user to insist on certain insertion directions for particular parts.

REQ-PATHS-AXIAL. This constraint requires that all assembly actions which form liaisons among a chosen set of parts be along specifically chosen axial directions. During the definition stage of this constraint, the user is given the opportunity to select any one or more the axial directions (+x, −x, +y, −y, +z, −z). Then the implementation of the constraint is as follows:

1. If move contains no controlled parts, or stat contains no controlled parts, then the action is valid by default, since no liaison is being created among the controlled part set.
2. Otherwise (i.e., if a liaison is being created among controlled parts), we check the proposed assembly trajectory against the allowed set of directions. If it is very close to one of the allowed directions, then the action is considered valid. Otherwise it is considered invalid.

REQ-STACK. This constraint requires that a specified group of parts be assembled in stack-like fashion: that is, one at a time, and all in the same specified direction. Note that this constraint does not specifically require the parts to be assembled sequentially. This can be specified separately by putting the stack parts in a cluster constraint, if desired. It is implemented as follows:

1. If there are no controlled parts in stat, or there are no controlled parts in move, then the action is considered valid by default (because the stack itself is not in the process of being formed).
2. If the stack is already present in move or in stat, then the action is considered valid.
3. Otherwise (that is, if at least one controlled part is present in each of stat and move), then the action is valid if and only if move consists of exactly one part, and the proposed trajectory is very close to the specified direction.

Note that the constraint assures that the parts are added one at a time, and in the right direction, but the order in which the parts are so added is determined by the geometric feasibility logic, which will only propose geometrically feasible sequences.

REQ-SUBASSY. This constraint requires that a defined set of parts appear as a subassembly at some time in the assembly plan. This could be as either a subassembly which is being inserted or as the stationery assembly being inserted into, or as the union of the two. This constraint is unusual in that it is one of a very few which require knowing only the set of parts involved, and not a breakdown into move and stat, to be evaluated for validity. We will call the entire set of parts in this assembly action "sub". sub is usually called move/stat. This constraint is implemented as follows:

1. If sub does not intersect group, then the action is valid by default.
2. If sub is contained in group, then the action is valid, because it is an action happening within the given subassembly.
3. If group is contained in sub, then the action is valid, because the group of parts is still together as a whole.
4. Otherwise, the action is invalid.

REQ-SUBASSY-WHOLE. This constraint requires that a defined set of parts be a subassembly (precisely as in the sense of REQ-SUBASSY), and that in addition, the planner is not to bother disassembling these parts any further. The valid() function for this constraint is implemented exactly as that for REQ-SUBASSY. In addition, if the entire set of parts is contained within group, the valid( ) function sets a flag which tells the planner not to bother disassembling this set any further. The planner checks this flag at appropriate times.

REQ-SUBSEQUENCE. This constraint requires that a given set of parts be assembled as a cluster, but with a number of sub-cluster constraints obeyed also. The user is allowed to choose whether the order of subclusters will be obeyed as an assembly sequence or a disassembly sequence. Assembly sequences are interpreted in reverse as disassembly sequences for reasons of efficiency of the planning process. Alternatively, one may think of this constraint as a sequence of clusters which must be assembled or disassembled in sequence, without interruption by other parts. If each cluster is defined as a single part, then this constraint can be used to request that an exact part assembly or disassembly sequence be followed. But the position of this sequence with the overall plan, the exact assembly action for each part (such as the insertion direction) are still determined as usual by the process.

This constraint is implemented as two levels of logic. At the higher level, it treats the union of the set of subclusters as a single cluster (or "supercluster"), and checks for the validity of the proposed action as regards this cluster, as with REQ-CLUSTER. If the action is valid in this cluster sense, then the fine structure is evaluated. In this finer check, the given "move" set is checked to see if it is a contained within one of the subclusters. If so, then we check to see that all subclusters before this one (in the disassembly sequence) are absent from stat, as they must be if they in fact were disassembled earlier. If so, then the action is valid for this constraint. Otherwise, the action in invalid.

REQ-SUCCESS-PART. This constraint requires that the plan be considered a success (and 'disassembly' planning terminated as soon as possible) when a defined group of parts has been removed from the assembly. This constraint does not affect the sequence of assembly, as is the norm for constraints. In fact, its valid() function always return TRUE. Instead, this constraint merely checks to see if any of the controlled parts are present in the current action. If not, it sets a flag for the planner, telling it not to bother disassembling this set any further. The planner checks this flag at appropriate times. One purpose of this constraint is to stop the planning process when it finishes a certain stage of disassembly, to avoid wasting time doing uninteresting work.

REQ-TOOL. This constraint requires that at least one of a user-defined list of tool applications be valid for a particular assembly operation. The user must interactively define each acceptable tool operation (one or more). The planner will determine the "free parameters" such as working angles of a wrench. This constraint is in effect a family of constraints, as the user can pick from a library of tools for each constraint. Depending on which tool is selected (such as a screwdriver, wrench, allen wrench, laser spot welder, etc) the constraint is effectively quite different.

Each tool selected has an ad hoc definition of its parameters. For example, the space required for use of the tool is whatever the tool designer defines it to be. A box end wrench, for example, can require about 60 degrees of circular motion of the handle to do its work. A racheting wrench can take less. An allen wrench can be declared to require a full 360 degrees of rotation. For each action, the user can declare alternative tools that can be used to perform the task. The example implementation automatically selects a feasible tool for each action, from the ones declared by the user, based on the available space for the tool and its motion. If no one of the declared tools can be appropriately applied, then the action will be declared invalid by the constraint. Thus, when a complete plan is found, the user is assured that there is sufficient space to apply each tool, and can see the tool being applied in the output, complete with specific choice of any free parameters, such as where the motion of a handle actually can take place.

SUG-NAME. This constraint has no effect on the actual planning process. Its valid( ) function always returns TRUE. Its function is to register a name for a set of parts. Then, this set of parts can be referred to as a whole when defining other constraints. For example, all the parts associated with this name can be selected when defining a cluster.

SUPPLEMENTAL ROUTINES (preprocessing of certain constraints). Three characteristics identified candidates for supplemental routine pre-processing:

1. the constraint either led to many dead-ends in the search space or ruled out a very large proportion of generated operations,
2. an efficient method existed to implement the preprocessing, and
3. the constraint was used often.

The REQ-SUBASSY, REQ-SUBASSY-WHOLE, and REQ-ORDER-LAST constraints are common enough and have a sufficiently global effect on the disassembly planning process that it is efficient to preprocess the assembly to ensure that only those disassembly operations which obey these constraints are considered by the planner.

When a candidate disassembly action is selected for a specific target assembly, a "blocks" data structure is created which tracks which parts in the target assembly are known to block one another in certain trajectories. When a REQ-SUBASSY or REQ-SUBASSY-WHOLE constraint exists whose subassembly is a proper subset of the target assembly, pairwise blocking links are established between all pairs of parts within the required subassembly. When a REQ-ORDER-LAST constraint exists, the existence of any of "last" parts in the target assembly causes the creation of blocking links from all parts in the assembly which are not "last" parts to all of those which are "last" parts. These blocking links, which are treated the same as any geometric blocking links caused by the target assembly and a given disassembly trajectory, prevent any operations which violate them from being generated, thereby speeding up the process of finding operations which satisfy the constraints.

For example, if the user created a REQ-SUBASSY constraint with part set P, and parts not in P are present, then P could not be "split" at that point in the plan. To implement this constraint efficiently, a supplemental routine bound the parts of P together for that stage, not considering any operations that split them. This was accomplished by placing bidirectional arcs between every pair of parts in P in every blocking graph of the subassembly.

The REQ-FASTENER constraint type is another instructive example. Fasteners are very common in mechanical assemblies. The REQ-FASTENER constraint required that as soon as one set of parts is joined (the fastened parts), then a set of fastener parts must immediately be placed. In reverse, this constraint means that as soon as a single fastener part was removed, then all other fasteners must be immediately removed, followed by at least one of the fastened parts. If any of the fasteners could not be removed, a dead end appeared in the search space (a similar dead end would appear in a forward-planning system).

The filter function for REQ-FASTENER was straightforward, but its supplemental routines were complex. The fastener parts are removed from the assembly representation and considered secondary parts, that implicitly must be added when the fastened parts are mated. Before generating operations to construct a certain subassembly, the planner determined which fasteners could be placed into it; for those that could not, the corresponding fastened parts were bound together as for REQ-SUBASSY. Fasteners were placed back in subassemblies for collision checking and other calculations.

Note that when a constraint has supplemental routines, the example implementation still called the constraint's filter function, which should never return false. This double check was very useful to ensure correctness, because the supplemental routines were complex and could interact with each other. A supplemental routine is conceivable that would reduce the number of operations rejected by the filter function.

INTERACTION

Experiments with product designers and assembly process engineers showed that a high level of interactivity aided successful application of the example implementation. Usually the designer cannot list all the constraints on assembly order at the start of the planning session. However, many of these constraints became apparent to the designer when the system graphically illustrated an assembly plan that violated them. Seeing a violation, adding a constraint to remove it, and then replanning became the main cycle of interaction. In this way, the automated assembly planner aids constraint discovery and management as well as plan generation and optimization.

Note, however, that placing a new constraint is very different from ruling out a certain operation, as performed in previous systems. While a single operation demonstrates the need for a constraint, placing the constraint usually limited the allowable plans far more than prohibiting the single operation. In many cases, the constraint encodes the manufacturing constraint exactly.

The plan-communicate-constrain-replan cycle requires that replanning be performed at interactive speeds. In the example implementation, a first assembly plan for a product can usually be found in a few minutes. However, the most expensive part of planning is ensuring that part insertions are collision-free. By saving collision-detection information, replanning usually requires 10 or 20 seconds for assemblies of up to 100 parts.

If all of the constraints the user has instantiated could not be satisfied by a single plan, then the example implementation failed and entered a "debug" mode that helped the user to determine the cause of the failure. If the constraints were all real, then a problem with the product design may be indicated. In most cases, some constraints could be adjusted to allow planning to succeed. When there are inaccuracies or inconsistencies in the product CAD data, planning could fail before the user has entered any constraints. The debug mode also supported finding such problems.

ASSEMBLY PLANNING APPROACH

The example implementation generated two-handed monotone assembly sequences in reverse, starting from the more highly constrained, fully assembled state. The search space is an AND/OR graph of subassembly states and operations to construct them from smaller subassemblies. The example implementation used an NDBG of each subassembly to efficiently determine assembly operations that might be performed to construct that subassembly, then checked these operations for geometric collisions, which can be viewed as a built-in filter. Operations were then checked against the list of user constraints.

The search strategy was tuned to generate a first plan as quickly as possible in the domain of mechanical assembly. Those skilled in the art will appreciate a variety of suitable search strategies. The example implementation used an AND/OR version of iterative sampling: during each pass of the algorithm a single assembly sequence was generated, making random choices of operations to construct each subassembly. The first time any subassembly was visited, only a single operation was generated to construct it, and the known subassemblies of that operation were then visited.

USER INTERFACE

The user interface can be important to effectiveness and user acceptance of an interactive planning system. The constraints should be easy to understand, define, and manage.

Figure 6:
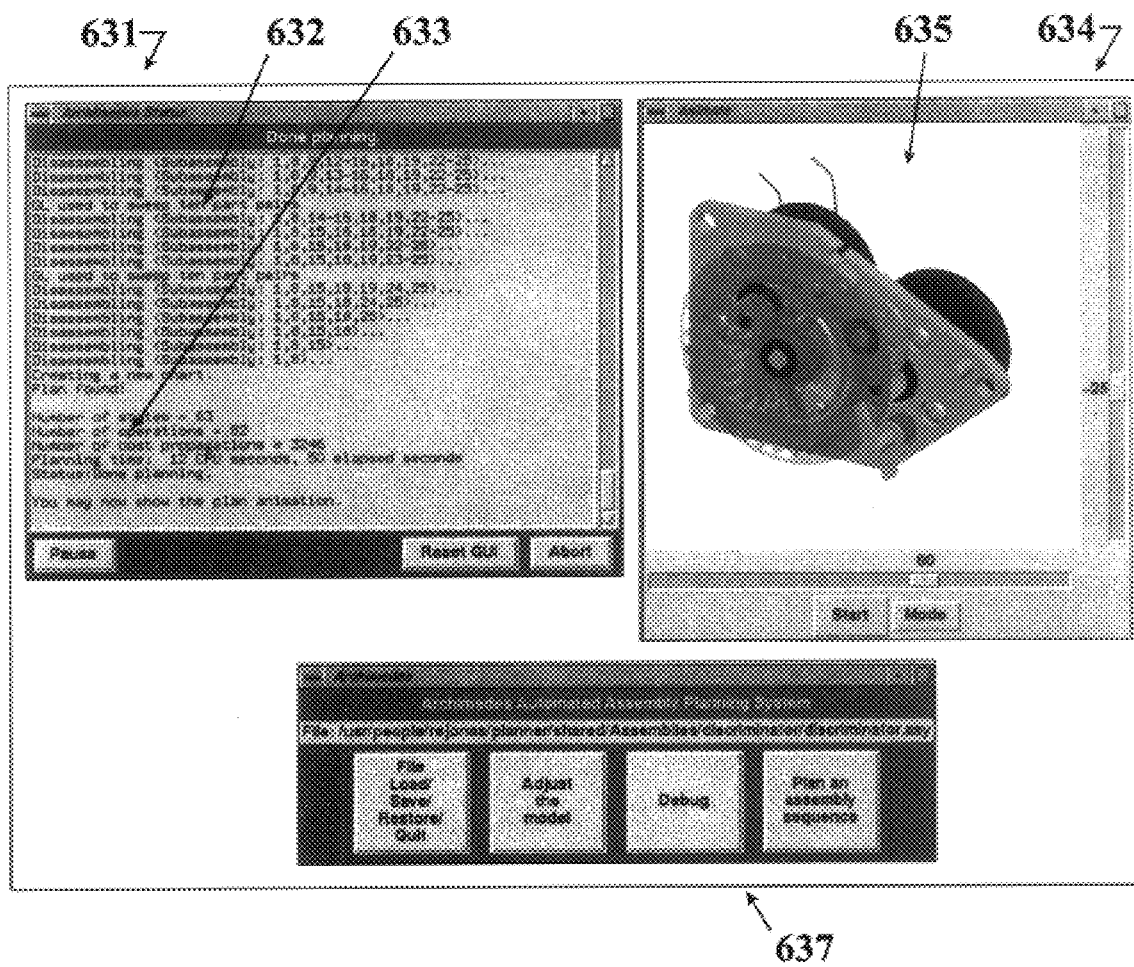
FIG. 6 is an illustration of the main user interface of an example implementation of the present invention.

FIG. 6 shows the main user interface. The upper left window 631 showed the program's current status 632, displayed any diagnostic output 633, and allowed pausing or aborting any computation. The upper right window 634 provided graphic output 635 and part/subassembly selection (not shown). At bottom is the main control window 637.

Figure 7:
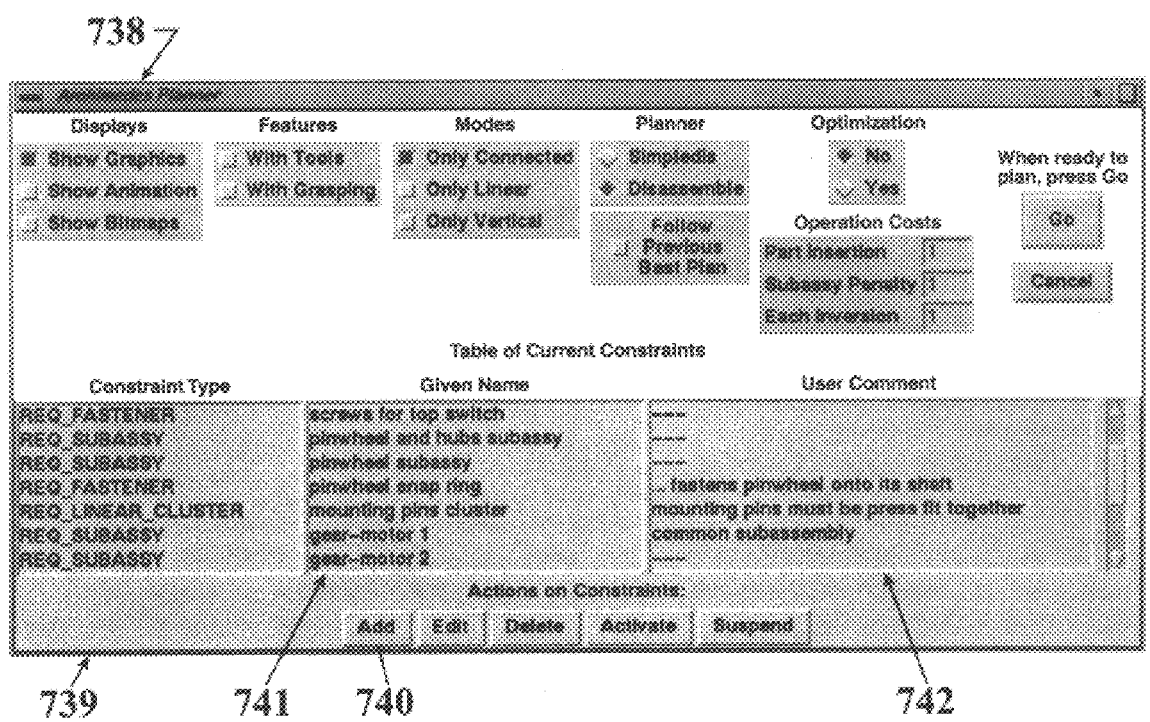
FIG. 7 is an illustration of a planning dialog in an example implementation of the present invention.

After loading the CAD data for an assembly and perhaps making some initial adjustments to it, the user selected "Plan", which brought up the planning dialog shown in FIG. 7. The top half 738 of this dialog concerned global choices for the planner, and the bottom half 739 provided management of the current set of constraints.

Constraints were added by clicking on the "Add" button 740 at the bottom, which brought up a sequence of menus and questions that let the user pick a constraint type and specify the particulars of the desired constraint. Each constraint required the user to select one or more parts of a "controlled" set in the graphic window, such as the parts making up a subassembly. For some constraints additional inputs were required, such as a second set of parts required by the constraint or the choice and placement of a tool to be used in assembly. An auxiliary window (not shown) provided a list of named subassemblies to facilitate selection of larger sets of parts. Each constraint could be given a name 741 and descriptive comment 742 by the user.

Once defined, constraints were listed in the planning dialog. They were edited using a process very similar to initial definition. They could also be deleted, temporarily suspended, and re-activated. Constraint suspension was a useful feature that allowed the user to consider various scenarios for assembly. Constraints often embody assumptions about product assembly; by suspending some and replanning, the user can compare the cost of removing the assumption to the possible gains in assembly sequence efficiency that result.

WHEN PLANNING FAILS

When the product cannot be assembled according to the current set of constraints, the example implementation failed and entered a "debug" mode that helped the user to determine the cause of the failure. For example, one could request that the planner try to remove a particular part or subassembly (from the subset of parts remaining when the planner failed) in a direction that appears possible. Collisions or constraints that disallow the operation were then posted in the status window. Other options included trying to disassemble every pair of parts in the offending subassembly, or trying to remove each part along a given trajectory.

The planner could fail without any user-defined constraints. This could be due to limitations in the planner's algorithms, such as an inability to reason about flexible parts such as snapfits and springs. Other times, inaccuracies or inconsistencies in the product CAD data caused the planner to fail. Examples include pressfit parts and threaded parts that are modeled as cylinders too large for their holes. The example implementation included a set of model adjustment features, or overrides, which were used to correct such problems. These included a function to effectively add threads to cylindrical contacts between parts; to specify that certain part insertions were in fact possible, even though collisions occur between the parts; and to delete a part temporarily.

EFFICIENCY

As mentioned above, the generate-and-test abstraction can sometimes lead to an inefficient planning process, in which case supplemental routines can improve planning efficiency greatly. These routines can be dependent on the internal algorithms of the planner.

In almost all cases, adding constraints reduced planning time. Though the computation of the filter functions obviously required time, the time saved by not searching states below an invalid branch outweighed the cost. In fact, constraints can be used to guide the planner to a correct plan for assemblies that would otherwise be intractably large.

CODING SPECIFICS

The example implementation was implemented in C++, with Tcl/Tk used for the graphic interface and OpenGL(TM) for graphics and animation, and ACIS(TM) for three-dimensional geometric calculations. The constraints are implemented as a hierarchy of C++ derived classes. Each type of constraint simply overrides the filter function from a base class, along with methods to define the type, name, etc. of the constraint. Each constraint type also has its own data members, such as part sets, tool choices and points of application, and so on. Some of the supplemental routines are implemented as constraint class methods; however, most cannot be separated from the planner's algorithms, and are woven directly into the planner implementation.

EXPERIMENTS

The example implementation has been applied to a number of actual assemblies from sources in government and industry.

Figure 8:
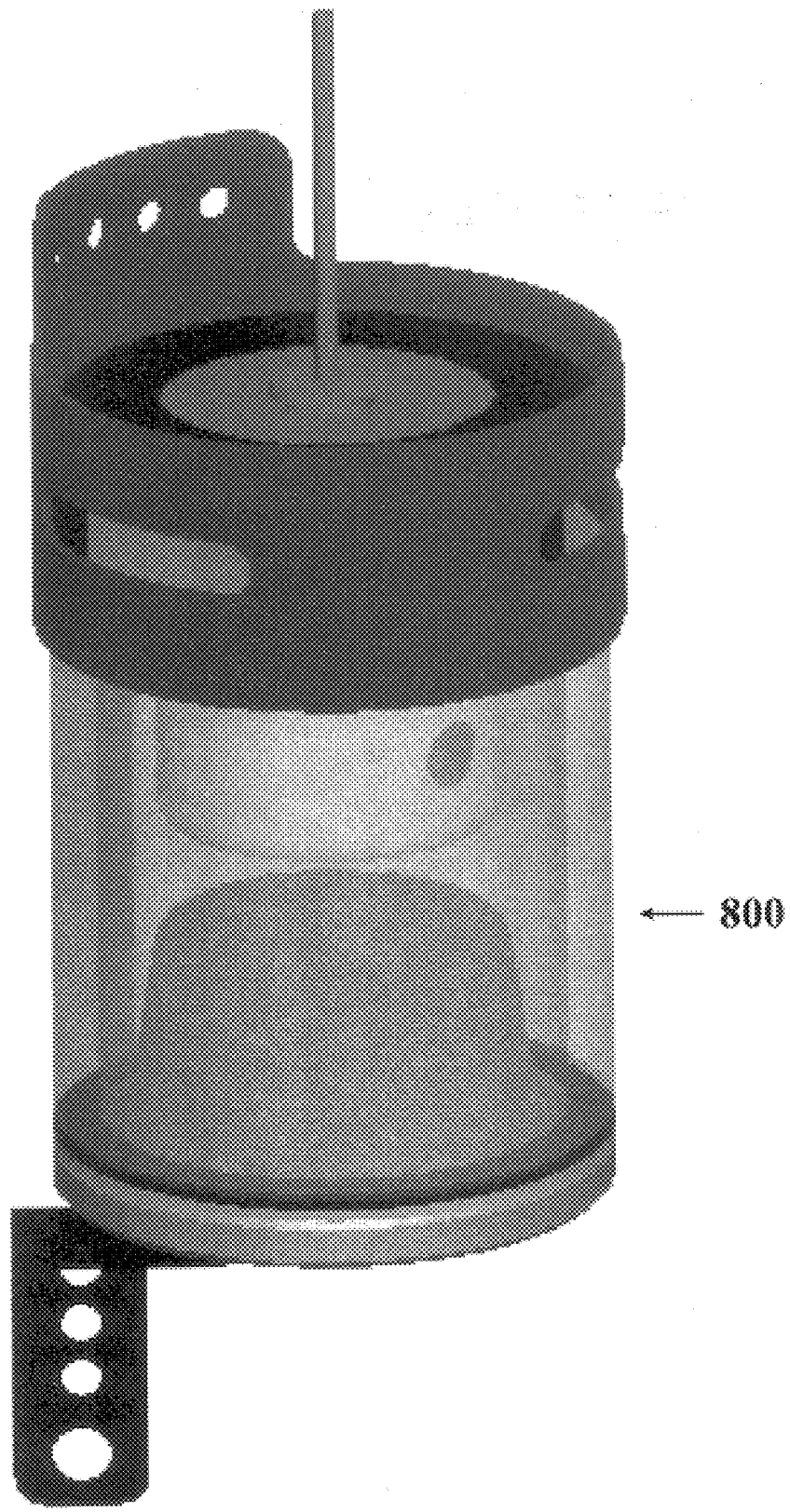
FIG. 8 is an illustration of a sprytron.

A sprytron 800, shown in FIG. 8, is an eighteen part diode-like device, including a surrounding assembly fixture. Most of the parts are symmetric or nearly symmetric about a central axis. The CAD data required no overrides to produce a first plan. However, in the resulting assembly plan some parts that would more naturally be inserted along the axis were inserted from other directions. Adding a REQ-PATHS-AXIAL constraint removed all these unwanted directions, and adding a REQ-ORDER-FIRST placing the fixture first made the assembly plan even better. Three REQ-ORDER-LIAISON constraints were then added to satisfy specific manufacturing constraints.

A door latch mechanism involved 23 parts, some of which were very complex. The presence of several snapfit or riveted fasteners, plus many inaccuracies in the CAD data, required 28 overrides. A good assembly plan was obtained after eight REQ-SUBASSY constraints were added, and one REQ-ORDER-LAST was used.

Figure 9:
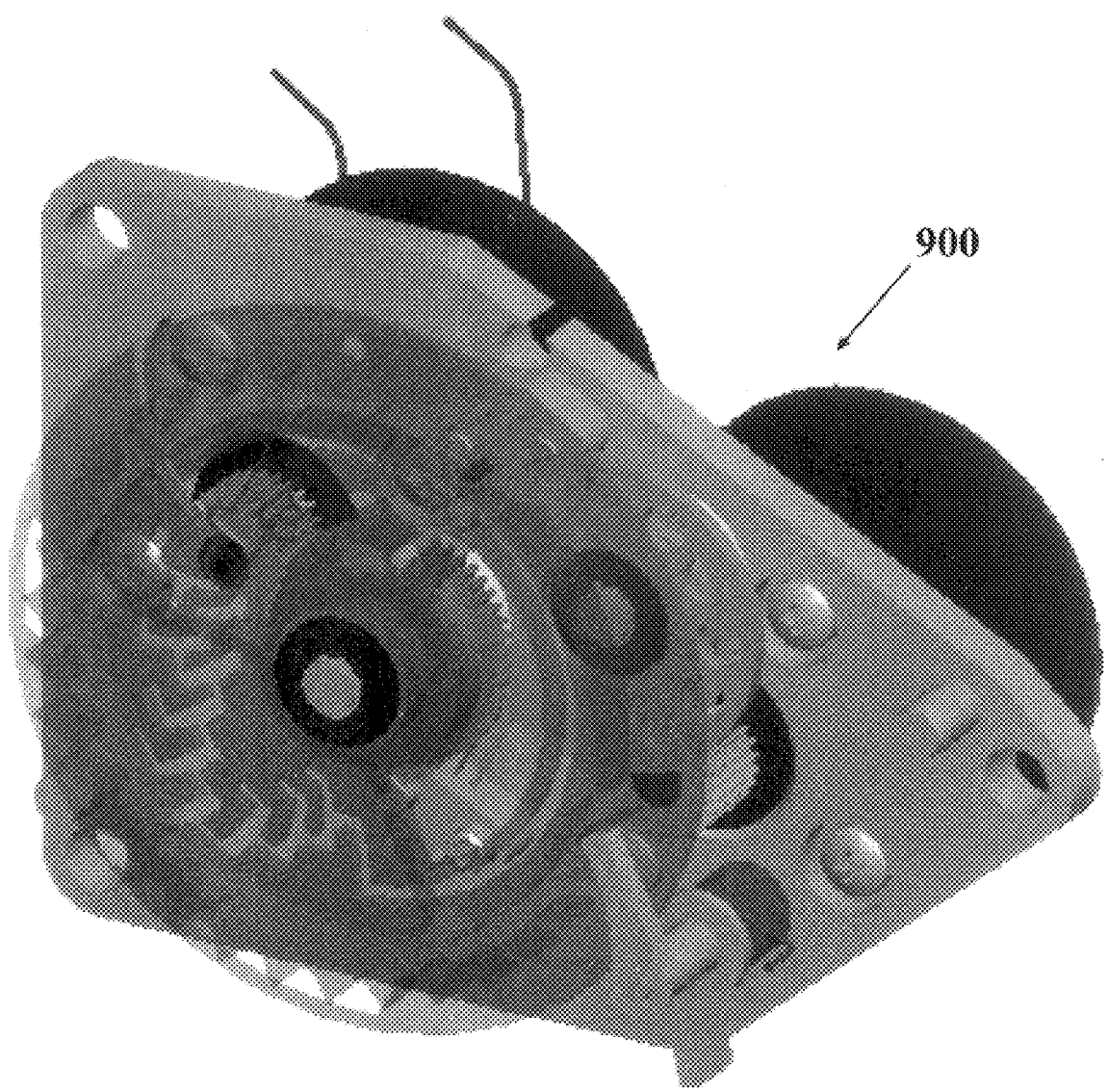
FIG. 9 is an illustration of a discriminator.

A discriminator 900, shown in FIG. 9, is a 42-part clockwork-like mechanism used as a safety device. Several parts overlapped in the CAD data, including 12 screws which were modeled larger than their corresponding holes, resulting in 18 model overrides. An assembly plan for the resulting adjusted model was then found with no need for constraints. Seven REQ-FASTENER constraints were required to place all fasteners in appropriate groups, and six REQ-SUBASSY constraints matched the subassemblies intended by the designer. In addition, one REQ-LINEAR-CLUSTER was used, and the chassis was requested to be placed first with a REQ-ORDER-FIRST.

Figure 10:
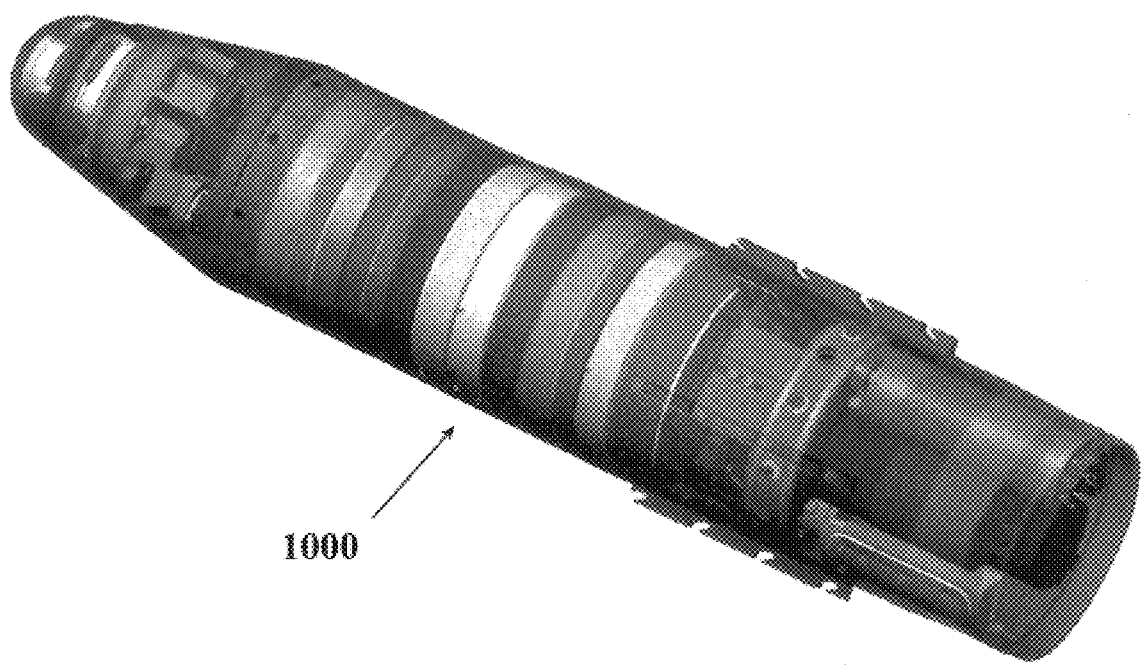
FIG. 10 is an illustration of an initial design of the guidance section of a Hughes Aircraft AIM-9x air-to-air missile.

The assembly 1000 in FIG. 10 is an initial design of the guidance section of a Hughes Aircraft AIM-9X air-to-air missile. With 472 parts described by 55Mb of ACIS(3) data (translated from Pro/ENGINEER(TM)) and over 800,000 facets, the guidance section assembly is to our knowledge the largest assembly that has been processed by any automated assembly planning system. Since the example implementation planned only for straight line assembly motions, and this assembly contained a number of flexible parts (such as cables) that could not use straight line insertions, we overrode 22 part mating situations with specific matings. Four other overrides clarified contacts between parts. A large number of REQ-SUBASSY-WHOLE constraints were used for subassemblies. A breakdown of all the constraints used to produce a useful assembly plan is in FIG. 11. After loading and facetting all the parts in the guidance section assembly, the example implementation required approximately 22 minutes to find all contacts and produce an assembly plan. After modifying constraints, replanning is usually performed in a few minutes.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. An apparatus for generating a disassembly sequence for a mechanical system, wherein the mechanical system comprises a plurality of parts, comprising:

a) a processing unit;

b) a storage system connected with the processing unit;

c) an input device connected with the processing unit;

d) an output device connected with the processing unit;

e) model input means for using the input device to load a model of the mechanical system into the storage system, wherein the model defines the plurality of parts and relationships therebetween in the mechanical system;

f) constraint input means for loading constraints into the storage system, where a constraint is a design rule that precludes certain geometrically feasible sequences of disassembly steps in a disassembly sequence;

g) output means for using the output device to communicate a disassembly sequence to a user;

h) candidate sequence means for generating a candidate disassembly sequence, where each step in the candidate disassembly sequence is both geometrically feasible and constraint feasible; and i) interactive means for generating the disassembly sequence, comprising means for performing the steps of:
    i) invoking the candidate sequence means;
    ii) invoking the output means; and
    iii) if the user indicates that additional constraints are desired then invoking the constraint means and restarting at step i).

2. The apparatus of claim 1, wherein constraints accepted by the constraint input means comprise at least one of: PRH-STAT, PRH-SUBASSY, REQ-CLUSTER, REQ-FASTENER, REQ-LINEAR-CLUSTER, REQ-ORDER-FIRST, REQ-ORDER-LAST, REQ-ORDER-LIASON, REQ-ORDER-PART, REQ-PART-SPECIAL, REQ-PATHS-AXIAL, EQ-STACK, REQ-SUBASSY, REQ-SUBASSY-WHOLE, REQ-SUBSEQUENCE, REQ-SUCCESS-PART, REQ-TOOL, and SUG-NAME.

3. An apparatus for generating a disassembly sequence for a mechanical system, wherein the mechanical system comprises a plurality of parts, comprising:
    a) a processing unit
    b) a storage system connected with the processing unit;
    c) an input device connected with the processing unit;
    d) an output device connected with the processing unit;
    e) model input means for using put device to load a model of the mechanical system into the storage system, wherein the model defines the plurality of parts and relationships therebetween in the mechanical system, wherein the model input means comprises contact means for determining a contacts set comprising contacts between parts in the assembled mechanical system;
    f) constraint input means for loading constraints into the storage system;
    g) output means for using the output device to communicate a disassembly sequence to a user;
    h) candidate sequence means for generating a candidate disassembly sequence, where each step in the candidate disassembly sequence is both geometrically feasible and constraint feasible, wherein the candidate sequence means comprises:
        i) candidate action means for determining a disassembly action from the contacts set and a model of a portion of the mechanical system, wherein a disassembly action comprises a part to be removed from the mechanical system and a path along which the part can be removed;
        ii) constraint checking means for checking constraint feasibility of a disassembly action based on constraints loaded by the constraint input means;
        iii) geometry checking means for checking geometric feasibility of a disassembly action; and
        iv) means for performing the steps of:
            a) starting with an empty disassembly sequence;
            b) invoking the candidate action means to determine a candidate disassembly action;
            c) invoking the geometry checking means to determine the geometric feasibility of the candidate disassembly action;
            d) invoking the constraint checking means to determine constraint feasibility of the candidate disassembly action;
            e) if the candidate disassembly action is both geometrical feasible and constraint feasible, then adding the candidate disassembly action to the disassembly sequence and removing the part from the model of the portion of the mechanical system; and
            f) repeating steps b) through e) until a desired terminal condition has been reached; and
    i) interactive means for generating the disassembly sequence, comprising means for performing the steps of:
        i) invoking the candidate sequence means;
        ii) invoking the output means; and
        iii) if the user indicates that additional constraints are desired then invoking the constraint means and restarting at step i).

4. The apparatus of claim 3, wherein the contact means comprises:
    a) means for locating surfaces in the assembled mechanical system that are substantially in contact with other surfaces in the assembled mechanical system;
    b) means for establishing a contact directions between said surfaces from the orientation of said surfaces; and
    c) means for encoding the identities of said surfaces and the corresponding contact directions into a data structure.

5. The apparatus of claim 3, wherein the constraint input means comprises means for loading constraint objects into the storage system, wherein a constraint objectors queriable as to whether a disassembly action satisfies the constraint; and wherein the constraint checking means comprises means for querying each constraint object and indicating that a disassembly action is constraint feasible if all of the constraint objects indicate that the disassembly action is valid.

6. The apparatus of claim 3, wherein the geometry checking means comprises:
    a) a z-buffer;
    b) means for clearing the z-buffer;
    c) means for setting the viewpoint of the z-buffer to the opposite of the direction required by the candidate disassembly action;
    d) means for drawing the mechanical system except for the part to be removed by the candidate disassembly action in the z-buffer in a first color;
    e) means for drawing the part to be removed by the candidate disassembly action in the z-buffer in a second color, where the second color is different from the first color;
    f) means for checking for pixels with the second color in the z-buffer; and
    g) means for providing an indication that the candidate disassembly action is not geometrically feasible if there are any selected patterns of pixels with the second color in the z-buffer.

7. The apparatus of claim 3, wherein constraints accepted by the constraint input means comprise at least one of: PRH-STAT, PRH-SUBASSY, REQ-CLUSTER, REQ-FASTENER, REQ-LINEAR-CLUSTER, REQ-ORDER-FIRST, REQ-ORDER-LAST, REQ-ORDER-LIASON, REQ-ORDER-PART, REQ-PART-SPECIAL, REQ-PATHS-AXIAL, EQ-STACK, REQ-SUBASSY, REQ-SUBASSY-WHOLE, REQ-SUBSEQUENCE, REQ-SUCCESS-PART, REQ-TOOL, and SUG-NAME.

8. A process for using a computer to generate a disassembly sequence for a mechanical system, wherein the mechanical system comprises a plurality of parts, comprising the steps of:
    a) loading a model of the mechanical system into the computer;
    b) generating a candidate disassembly sequence;

c) communicating the candidate disassembly sequence to a user; and d) if the user indicates that constraints are required, then accepting constraints from the user, where a constraint is a design rule that precludes certain geometrically feasible sequences of disassembly steps in a disassembly sequence, and restarting the process at step b).

9. The process of the claim 8, wherein the step of loading a model of the mechanical system comprises determining contacts between parts in the assembled mechanical system.

10. The process of the claim 8, wherein the step of accepting constraints from the user comprises accepting from the user new constraints.

11. The process of the claim 8, wherein the step of accepting constraints from the user comprises accepting from the user redefinitions of existing constraints.

12. The process of the claim 8, wherein the step of accepting constraints from the user comprises accepting from the user direction to remove existing constraints.

13. The process of the claim 8, wherein the step of accepting constraints from the user comprises accepting from the user direction to suspend existing constraints.

14. The process of claim 8, wherein constraints accepted from the user comprise at least one of: PRH-STAT, PRH-SUBASSY, REQ-CLUSTER, REQ-FASTENER, REQ-LINEAR-CLUSTER, REQ-ORDER-FIRST, REQ-ORDER-LAST, REQ-ORDER-LIASON, REQ-ORDER-PART, REQ-PART-SPECIAL, REQ-PATHS-AXIAL, EQ-STACK, REQ-SUBASSY, REQ-SUBASSY-WHOLE, REQ-SUBSEQUENCE, REQ-SUCCESS-PART, REQ-TOOL, and SUG-NAME.

15. A process for using a computer to generate a disassembly sequence for a mechanical system, wherein the mechanical system comprises a plurality of parts, comprising the steps of:

a) loading a model of the mechanical system into the computer;

b) generating candidate disassembly sequence, wherein the step of generating a candidate disassembly sequence comprises:

i) initializing a candidate disassembly sequence to empty;

ii) generating a candidate disassembly action, where a candidate disassembly action comprises at least one part to be removed from the model of the mechanical system and a path along which the part is to be removed;

iii) checking the candidate disassembly action by, in any order:

a) checking the candidate disassembly action and the model of the mechanical system for geometric feasibility of the candidate disassembly action; and b) checking the candidate disassembly action, the model of the mechanical system, and any constraints for constraint feasibility of the candidate disassembly action;

iv) adding the candidate disassembly action to the candidate disassembly sequence if the candidate disassembly action is both geometrically feasible and constraint feasible; and V) repeating steps ii) through iv) using the portion model until a desired terminal condition is reached;

c) communicating the candid-ate disassembly sequence to a user; and d) if the user indicates that constraints are required, then accepting constraints from the user, and restarting the-process at step b).

16. The process of the claim 15, wherein the computer comprises a z-buffer, and wherein the step of checking the candidate disassembly action and the model of the mechanical system for geometric feasibility of the candidate disassembly action comprises;

a) clearing the z-buffer;

b) setting the viewpoint of the z-buffer to the opposite of he direction required by the candidate disassembly action;

c) drawing the mechanical system except for the part to be removed by the candidate disassembly action in the z-buffer in a first color;

d) drawing the part to be removed by the candidate disassembly action in the z-buffer in a second color, where the second color is different from the first color;

e) checking for pixels with the second color in the z-buffer; and f) providing an indication that the candidate disassembly action is not geometrically feasible if there are any pixels with the second color in the z-buffer.

17. The process of claim 15, wherein constraints accepted from the user comprise at least one of: PRH-STAT, PRH-SUBASSY, REQ-CLUSTER, REQ-FASTENER, REQ-LINEAR-CLUSTER, REQ-ORDER-FIRST, REQ-ORDER-LAST, REQ-ORDER-LIASON, REQ-ORDER-PART, REQ-PART-SPECIAL, REQ-PATHS-AXIAL, EQ-STACK, REQ-SUBASSY, REQ-SUBASSY-WHOLE, REQ-SUBSEQUENCE, REQ-SUCCESS-PART, REQ-TOOL, and SUG-NAME.

18. A process for using a computer to generate a disassembly sequence for a mechanical system, wherein the mechanical system comprises a plurality of parts, comprising the steps of:

a) loading a model of the mechanical system into the computer;

b) determining contacts between parts in the assembled mechanical system;

c) initializing a candidate disassembly sequence to empty;

d) generating a candidate disassembly action, where a candidate disassembly action comprises at least one part to be removed from the model of the mechanical system and a path along which the part is to be removed;

e) checking the candidate disassembly action by, in any order:

i) checking the candidate disassembly action and the model of the mechanical system for geometric feasibility of the candidate disassembly action; and ii) checking the candidate disassembly action, the model of the mechanical system, and any constraints for constraint feasibility of the candidate disassembly action;

f) adding the candidate disassembly action to the candidate disassembly sequence if the candidate disassembly action is both geometrically feasible and constraint feasible;

g) repeating steps c) through f) until a desired terminal condition is reached;

h) communicating the candidate disassembly sequence to a user; and i) if the user indicates that constraints are required, then accepting constraints from the user, and restarting the process at step c).

19. The process of claim 18, wherein constraints accepted from the user comprise at least one of: PRH-STAT, PRH- SUBASSY, REQ-CLUSTER, REQ-FASTENER, REQ-LINEAR-CLUSTER, REQ-ORDER-FIRST, REQ-ORDER-LAST, REQ-ORDER-LIASON, REQ-ORDER-PART, REQ-PART-SPECIAL, REQ-PATHS-AXIAL, EQ-STACK, REQ-SUBASSY, REQ-SUBASSY-WHOLE, REQ-SUBSEQUENCE, REQ-SUCCESS-PART, REQ-TOOL, and SUG-NAME.

20. A process for assembling a mechanical system, wherein the mechanical system comprises a plurality of parts, comprising the steps of:
  a) loading a model of the mechanical system into a computer;
  b) determining contacts between parts in the assembled mechanical system;
  c) initializing a candidate disassembly sequence to empty;
  d) generating a candidate disassembly action, where a candidate disassembly action comprises a part to be removed from the model of the mechanical system and a path on which the part is to be removed;
  e) checking the candidate disassembly action by, in any order:
    i) checking the candidate disassembly action and the model of the mechanical system for geometric feasibility of the candidated disassembly action; and
    ii) checking the candidate disassembly action, the model of the mechanical system, and any constraints for constraint feasibility of the candidate disassembly action;
  f) adding the candidate disassembly action to the candidate disassembly sequence if the candidate disassembly action is both geometrically feasible and constraint feasible;
  g) repeating steps c) through f) until a desired terminal condition is reached;
  h) communicating the candidate disassembly sequence to a user;
  i) if the user indicates that constraints are required, then accepting constraints from the user, and restarting the process at step c);
  j) if the user indicates that no additional constraints are required, then communicating the candidate disassembly sequence; and
  k) assembling the mechanical system by following the disassembly sequence in reverse order.

* * * * *